United States Patent [19]

Rauf et al.

[11] Patent Number: 4,514,887
[45] Date of Patent: May 7, 1985

[54] ROLL FOR USE IN CALENDARS OR THE LIKE

[75] Inventors: Richard Rauf, Krefeld-Oppum; Josef Pav, Krefeld; Klaus Schöll, Krefeld-Fischeln, all of Fed. Rep. of Germany

[73] Assignee: Kleinewefers GmbH, Krefeld, Fed. Rep. of Germany

[21] Appl. No.: 450,110

[22] Filed: Dec. 15, 1982

[30] Foreign Application Priority Data

Dec. 23, 1981 [DE] Fed. Rep. of Germany ....... 3151001

[51] Int. Cl.³ .............................................. B21B 13/02
[52] U.S. Cl. ............................ 29/116 AD; 100/162 B; 100/170; 384/99
[58] Field of Search .............. 29/116 AD; 100/162 B, 100/170; 384/99, 100

[56] References Cited

U.S. PATENT DOCUMENTS

| | | | |
|---|---|---|---|
| 2,474,512 | 6/1949 | Bechtold et al. | 100/170 X |
| 2,691,339 | 10/1954 | Edwards | 100/170 |
| 2,897,538 | 8/1959 | Shapiro et al. | 100/162 B X |
| 3,231,046 | 1/1966 | Ohrnberger | 384/100 X |
| 3,578,766 | 5/1971 | Diolot | 100/170 X |
| 3,885,465 | 5/1975 | Bergendahl | 100/170 X |
| 4,198,905 | 4/1980 | Lehmann | 29/116 AD X |
| 4,228,571 | 10/1980 | Biondetti | 29/116 AD |

FOREIGN PATENT DOCUMENTS

| | | |
|---|---|---|
| 2837346 | 5/1981 | Fed. Rep. of Germany . |
| 2942002 | 5/1981 | Fed. Rep. of Germany . |

*Primary Examiner*—Carl E. Hall
*Assistant Examiner*—John T. Burtch
*Attorney, Agent, or Firm*—Peter K. Kontler

[57] ABSTRACT

A calender roll wherein a hollow rotary cylindrical shell surrounds a stationary carrier and the latter supports a set of hydraulic cylinder and piston units serving to urge the external surface of a bearing element toward the internal surface of the shell. The external surface of the bearing element is formed with liquid-filled pockets each of which communicates with the cylinder chamber of a pressure generating unit. The cylinder chambers receive pressurized liquid from a pump via first conduits whose resistance to the flow of liquid is more pronounced than that of second conduits which directly connect the cylinder chambers with one or more hydropneumatic accumulators.

11 Claims, 3 Drawing Figures

ROLL FOR USE IN CALENDARS OR THE LIKE

BACKGROUND OF THE INVENTION

The present invention relates to rolls for use in calenders and analogous machines. More specifically, the invention relates to improvements in rolls of the type wherein a hollow cylindrical shell is rotatable about a stationary carrier which supports one or more bearing elements and one or more hydraulic pressure generators in the form of cylinder and piston units serving to urge the bearing element(s) against the internal surface of the shell. Still more particularly, the invention relates to improvements in rolls of the type wherein each bearing element has an external surface provided with one or more recesses or pockets communicating with the cylinder chamber or chambers of the associated pressure generating device(s) and wherein the pressure generating device or devices are connected with one or more sources of pressurized hydraulic fluid.

German Offenlegungsschrift No. 29 42 002 discloses a roll wherein the shell is rotatable about a fixedly mounted carrier which supports an axially extending row of bearing elements each having pockets machined into that surface which is adjacent to the internal surface of the shell. Each bearing element is acted upon by at least two discrete pressure generating devices in the form of cylinder and piston units. The piston of each such unit is secured to the carrier and extends into a cylinder chamber which is provided in the corresponding bearing element and communicates with a pocket in the external surface of such bearing element. The pistons are surrounded by seals which fit snugly into the respective cylinder chambers. The connections between the cylinder chambers and the pockets in the external surfaces of the bearing elements constitute or contain flow restricting elements. The individual cylinder and piston units for a given bearing element and/or the cylinder and piston units for different bearing elements can be connected to separate sources of pressurized fluid. This enables the shell to resist flexing or bending stresses as well as to compensate for transversely acting forces which develop when the roll is in use in a calender or the like and cooperates with one or more similar or otherwise constructed rolls to treat a running web of paper, fabric or the like.

When a hydrostatically supported shell of the just outlined character exhibits certain defects which are attributable to the design of the roll and/or which develop while the roll is in use, the shell is subjected to abrupt and pronounced stresses and often tends to vibrate. Initial (manufacturing) defects can include improper balancing of the shell, deviations from acceptable tolerances and/or deviations from optimum mounting in the frame of a calender or another machine, as considered in the axial direction of the roll. Defects which develop in actual use can include thermally induced expansion or contraction of the shell and/or other constituents of the roll. The problems which arise as a result of vibrations and/or development of abrupt and pronounced stresses are particularly serious when the roll forms part of a system of rolls which treat running webs of paper, fabric or the like by the application of pressure in that the roll cooperates with one or more additional rolls to impart to the corresponding side or sides of the running web a desired finish, texture, design and/or other characteristics. Defects in the configuration, dimensioning and/or mounting of one or more rolls can influence the operation of the remaining roll or rolls. Also, improper distribution of mass in the material which is being treated can also cause the development of undesirable stresses which can affect the useful life and/or the mode of operation of the roll or rolls, i.e., the quality of treatment which such roll or rolls impart to the processed material. The stresses upon the roll or rolls can be sufficiently pronounced to cause the establishment of actual contact between the external surface(s) of the bearing element(s) and the internal surface of the shell. Moreover, uncontrolled and pronounced stressing of the bearing elements can result in extensive wear upon and/or rapid destruction of the aforementioned seals which surround the pistons of the pressure generating devices for the bearing elements. This, in turn, can result in complete breakdown of the hydrostatic bearing system. Still further, improper functioning of the hydrostatic bearing system can adversely influence the finish of the external surfaces of the shells and hence the treatment of the running web or webs which are contacted by such external surfaces.

OBJECTS AND SUMMARY OF THE INVENTION

An object of the invention is to provide a novel and improved roll which can be used in calenders or analogous machines and which is constructed and assembled in such a way that abrupt and unpredictable stresses upon its shell are less likely to adversely influence the hydrostatic bearing system for the shell than in heretofore known rolls.

Another object of the invention is to provide a novel and improved hydrostatic bearing system for use in a calender roll or the like.

A further object of the invention is to provide a roll wherein unpredictable shifting and/or other movements of the shell relative to its carrier cannot adversely affect the condition of the hydrostatic bearing system for the shell.

An additional object of the invention is to provide a novel and improved method of protecting the hydrostatic bearing system for the shell of a calender roll or the like from damage or destruction as a result of unpredictable, pronounced and/or abrupt movements of the shell with reference to its carrier.

Still another object of the invention is to provide a hydrostatic bearing system which can effectively oppose, damp, reduce and/or withstand unpredictable stray movements of the shell relative to its carrier.

A further object of the invention is to provide the bearing system with novel and improved means for supplying pressurized hydraulic fluid to its pressure generating unit or units.

Another object of the invention is to provide a calender or an analogous machine which embodies one or more rolls of the above outlined character.

A further object of the invention is to provide a roll which exhibits the above outlined advantageous features and characteristics and which can be installed in existing calenders or analogous machines as a superior substitute for heretofore known rolls.

Another object of the invention is to provide a roll whose useful life can be prolonged in a simple and inexpensive way.

The invention is embodied in a pressure applying roll for use in calenders and the like. The roll comprises a hollow rotary cylindrical shell, at least one bearing element which is provided in the interior of the shell and whose external surface has at least one recess and is adjacent to the internal surface of the shell, pressure generating means which serves to urge the bearing element toward the internal surface of the shell and has at least one chamber communicating with the recess, a source of pressurized liquid which is arranged to supply pressurized liquid to the one chamber, and an elastically yieldable pressurized liquid reservoir system preferably having at least one accumulator and communicating with the chamber, at least while the latter is supplied with liquid by the aforementioned source. A valve or other suitable pressure regulating means can be interposed between the source (e.g., an oil pump) and the chamber.

The roll preferably further comprises first and second conduit means respectively connecting the chamber with the source and with the accumulator or accumulators of the reservoir system. The resistance which the first conduit means offers to the flow of liquid from the source to the chamber preferably exceeds the resistance which the second conduit means offers to the flow of liquid between the accumulator or accumulators and the chamber. The second conduit means is preferably designed to directly connect the accumulator or accumulators with the chamber.

The pressure generating means in the interior of the shell can comprise a plurality of chambers, and the source can include means for supplying the chambers with pressurized liquid at different pressures. The reservoir system of such a roll can comprise a plurality of accumulators each of which is connected with a different chamber. At least one accumulator can constitute a hydropneumatic accumulator, irrespective of whether the pressure generating means has a single chamber connected with one or more accumulators or two or more chambers each of which is connected with a single accumulator or with several accumulators.

The reservoir system can comprise a plurality of accumulators which are connected in parallel. Such reservoir system can comprise a series of successive accumulators each of which is arranged to store a supply of liquid at a different pressure.

The bearing element or elements and the pressure generating means are preferably mounted on a stationary carrier which is surrounded by the shell.

A portion of the conduit means which connects an accumulator with the associated chamber can form part of the conduit means which connects such chamber with the corresponding source of pressurized liquid.

The novel features which are considered as characteristic of the invention are set forth in particular in the appended claims. The improved pressure applying roll itself, however, both as to its construction and the mode of operation of its hydrostatic bearing system, together with additional features and advantages thereof, will be best understood upon perusal of the following detailed description of certain specific embodiments with reference to the accompanying drawing.

DESCRIPTION OF THE PREFERRED EMBODIMENTS

Figure 1:
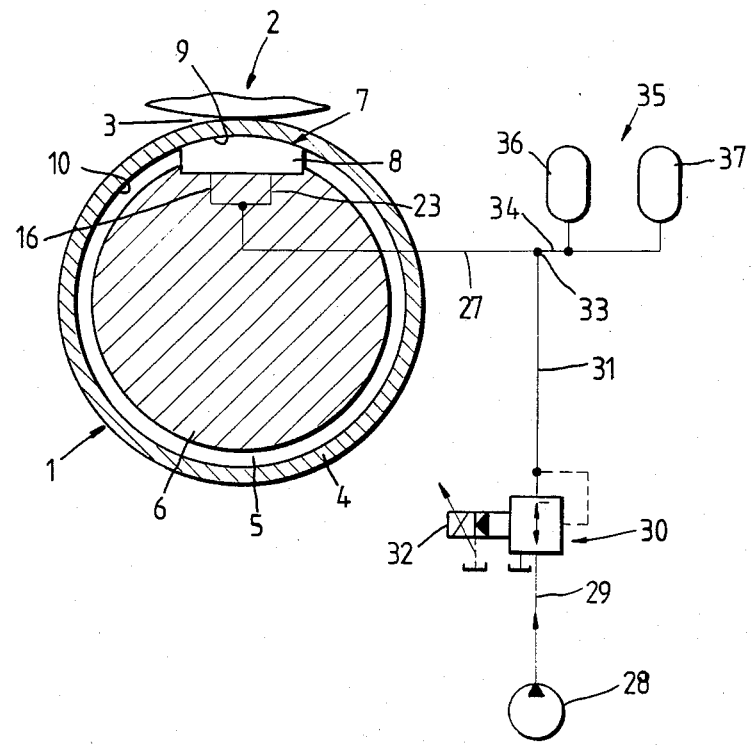
FIG. 1 is a schematic partly elevational and partly sectional view of a roll which embodies one form of the invention and comprises a common source of hydraulic fluid for several chambers of the pressure generating means.

FIG. 1 shows a first calender roll 1 which cooperates with a second calender roll 2 to treat running webs of paper, textile or the like. The material to be treated in caused to advance through the nip 3 of the rolls 1, 2 and is acted upon by pressure during contact with the external surfaces of the rolls.

Figure 2:
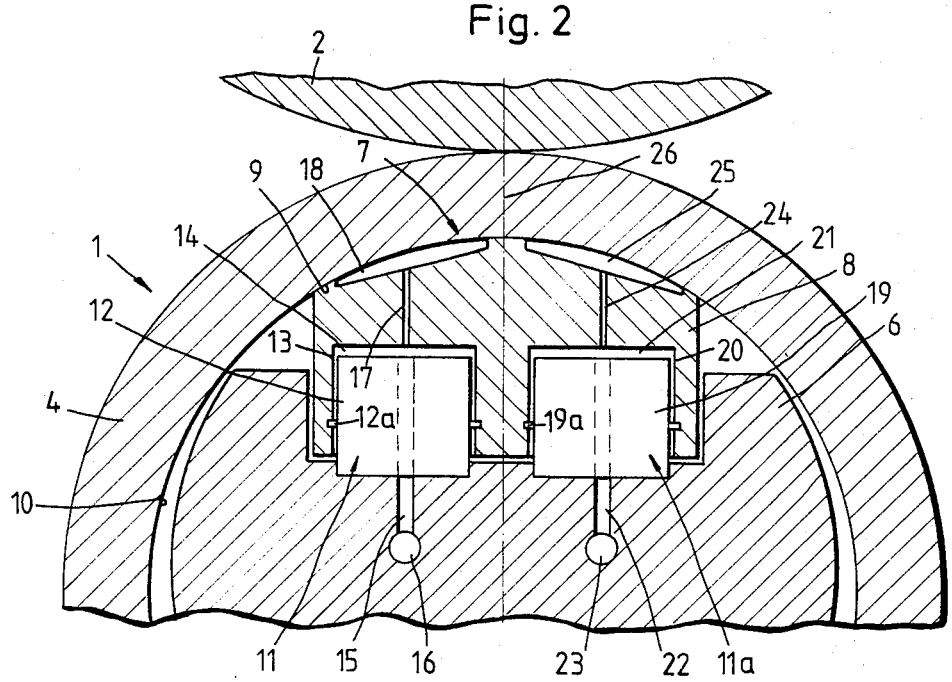
FIG. 2 is a greatly enlarged view of a detail in the roll of FIG. 1, with the bearing element shown in section.

The lower roll 1 comprises a hollow cylindrical shell 4 which surrounds and is rotatable about its axis relative to a stationary carrier 6. The internal surface 10 of the shell 4 and the external surface of the carrier 6 define an annular compartment 5 which accommodates a portion of a hydrostatic bearing system 7 including a bearing element 8 mounted on the upper portion of the carrier 6 and having an external surface 9 adjacent to the corresponding portion of the internal surface 10. As can be seen in FIG. 2, the external surface 9 is formed with two shallow recesses or pockets 18 and 25. The means for urging the bearing element 8 toward the internal surface 10 of the shell 4 comprises a pressure generating arrangement composed of two cylinder and piston units 11 and 11a supported by the carrier 6 and having cylinder chambers 14, 21 which respectively communicate with the recesses 18 and 25. These cylinder chambers are machined into the underside of the bearing element 8 and respectively receive portions of pistons 12, 19 which are anchored in the carrier 5 and are respectively surrounded by annular seals 12a, 19a of conventional design. The seals 12a, 19a are respectively recessed into the cylindrical surfaces 13, 20 bounding the respective cylinder chambers 14, 21. These chambers respectively communicate with the recesses 18, 25 via bores or channels 17, 24 machined into the bearing element 8. Furthermore, the chambers 14 and 21 communicate with a source 28 of pressurized hydraulic fluid (e.g., oil) by way of conduits 29, 31, 27 and channels 15, 22 and 16, 23 machined into the carrier 6. The units 11 and 11a are mirror symmetrical to each other with reference to a plane 26 which includes the axes of the rolls 1 and 2.

The source 28 may constitute or comprise a continuously operating hydraulic pump. This pump supplies pressurized liquid to the conduit 29 whence the liquid flows into the conduit 31 by way of a pressure regulating and relief valve 30 which is adjustable by a control unit 32. The latter can be set manually, by remote control or automatically in dependency on one or more parameters such as the desired pressure with which the rolls 1 and 2 bear against a running web in the nip 3, the material of the web, the intended treatment of the web and/or others. The exact nature of the means for setting the control unit 32 by hand or in any other way forms no part of the present invention.

The conduits 31 and 27 communicate with each other at a junction 33 which is further connected to a conduit 34 leading to a pressurized liquid reservoir system 35 including two accumulators 36 and 37, e.g., a pair of hydropneumatic, spring-operated or otherwise designed accumulators. Hydropneumatic (e.g., bladder or bag, diaphragm or cylinder type) accumulators are preferred at the present time. The conduit 34 is relatively short (as compared with the length of the conduit 31), and its inner diameter preferably greatly exceeds the inner diameter of the conduit 31. It is also preferred to make the channels 15, 16, 22, 23 and the conduit 27 as short as possible, and to select their diameters in such a way that the resistance which they offer to the flow of liquid between the accumulators 36, 37 and the cylinder chambers 14, 21 is a small fraction of the resistance which the conduit 31 offers to the flow of pressurized liquid from the valve 30 to the junction 33. The arrangement is preferably such that the resistance to flow of liquid between the cylinder chambers 14, 21 and the accumulators 36, 37 is negligible.

When they are not in use, the accumulators 36 and 37 of the system 35 are staggered in accordance with the magnitude of force applied to the liquid which is stored therein. Their liquid compartments are filled by the pump 28 so that the supply of gaseous medium or the spring therein is compressed to the desired extent, namely, to an extent corresponding to the pressure at the outlet of the pressure regulating valve 30. The thus selected pressure also prevails in the cylinder chambers 14, 21 of the pressure generating units 11 and 11a. Pressurized hydraulic fluid flows continuously via channels 17, 24 and into the respective recesses 18, 25 and escapes from such recesses through gaps (not specifically shown) which develop between the external surface 9 of the bearing element 8 and the internal surface 10 of the shell 4.

If the shell 4 is subjected to a shock in the region of the hydrostatic bearing system 7, namely, to a stress which causes the corresponding portion of the shell 4 to move toward the carrier 6, or if the shell is deformed from the very beginning in a direction to move nearer to the carrier 6 in the region of the system 7 (e.g., during each of its revolutions), the shell 4 does not strike against the external surface 9 of the bearing element 8 because the latter can yield by moving toward the axis of the carrier 6. The liquid which is thereby expelled from the cylinder chambers 14, 21 is admitted into the accumulator or accumulators 36, 37 of the reservoir system 35 whose air cushions or springs yield elastically to admit the liquid that is expelled from the pressure generating units 11 and 11a. By the same token, the bearing element 8 can move away from the axis of the carrier 6 when the shell 4 is subjected to a shock which tends to move its internal surface 10 away from the surface 9. At such time, the reservoir system 35 admits pressurized liquid from the accumulator 36 and/or 37 into the cylinder chambers 14 and 21. In each instance, the pressure in the cylinder chambers 14 and 21 remains at least substantially unchanged so that the bearing force is constant in spite of the movement of a portion of the shell 4 toward or away from the pistons 12 and 19. Furthermore, constancy of bearing pressure brings about another advantage, namely, the movements of the shell 4 toward or away from the pistons 12, 19 are damped so that the shell is highly unlikely to perform a recurring vibratory or analogous stray movement.

Figure 3:
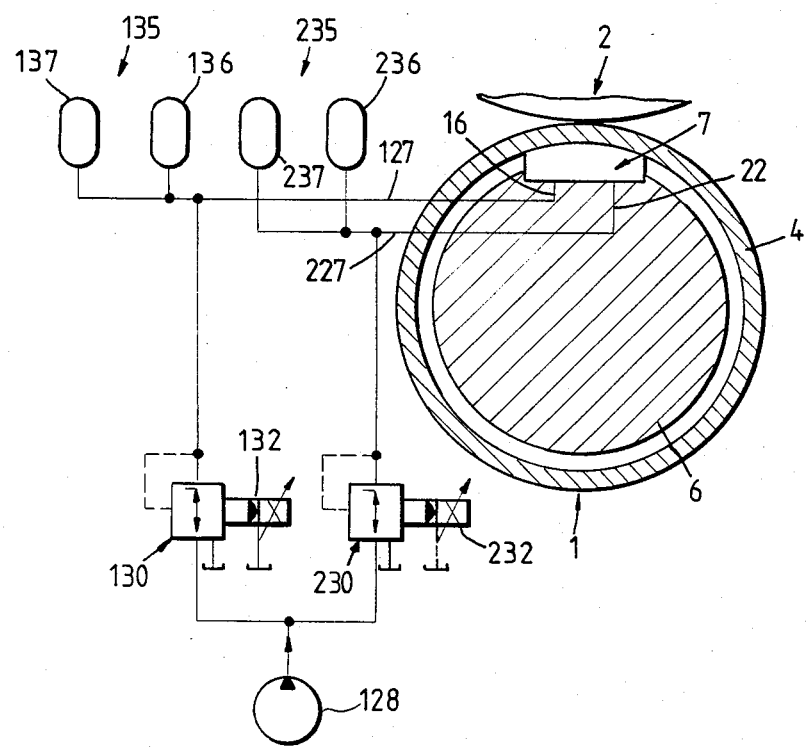
FIG. 3 is a schematic partly elevational and partly sectional view of a modified roll with discrete sources of pressurized liquid for each of the chambers and with discrete sets of accumulators for each such chamber.

FIG. 3 shows a portion of a modified machine wherein all such parts which are identical with or clearly analogous to corresponding parts of the structure shown in FIGS. 1 and 2 are denoted by similar reference characters. The main difference is that the channels 16 and 22 do not communicate with a common conduit (such as the conduit 27 in FIG. 1) but are connected with discrete conduits 127, 227 which are respectively connected with the accumulators 136, 137 and 236, 237 forming part of two discrete pressurized liquid reservoir systems 135 and 235. Furthermore, the conduits 127 and 227 are connected with two discrete sources of pressurized liquid including two pressure regulating and relief valves 130, 230 each of which ensures that the conduits 127 and 227 receive liquid at different pressures. The intakes of the valves 130, 230 receive pressurized liquid from a single pump 128 and the pressure at their outlets can be selected by discrete control units 132, 232. The structure of FIG. 3 is desirable and advantageous in many types of rolls where it is desired that the pressure of fluid in one cylinder chamber of the bearing element 8 be regulatable independently of pressure in the other cylinder chamber. A roll wherein the individual pressure generators for a given bearing element can receive liquid at different pressures is disclosed, for example, in commonly owned U.S. Pat. No. 4,328,744 (granted May 11, 1982 to Josef Pav et al.) whose disclosure is incorporated herein by reference.

The construction of FIGS. 1 and 2 is quite satisfactory when the source of pressurized liquid is designed to supply liquid at one pressure only, i.e., when there is no provision for admission of liquid to one cylinder chamber at a first pressure and to the other cylinder chamber or chambers at a different second pressure. Also, the structure of FIGS. 1 and 2 is evidently satisfactory when the means for urging the bearing element 8 toward the shell 4 includes only the pressure generating unit 11 or 11a. If the number of pressure generating units for a bearing element exceeds two (this is disclosed, for example, in the aforementioned commonly owned U.S. Pat. No. 4,328,744 to Pav et al.), all of the cylinder chambers can be connected with a single source (28) of pressurized fluid and to a single reservoir system (e.g., to the system 35). Alternatively, and as explained above in connection with FIG. 3, it is possible to connect a first cylinder chamber with a first reservoir system or a first accumulator or group of accumulators forming part of a single reservoir system while the remaining cylinder chamber or chambers are connected to a second source of pressurized liquid and to a discrete second reservoir system or a discrete second set of accumulators forming part of the single reservoir system. Still further, it is possible to provide a discrete source of pressurized liquid and a discrete accumulator or set of accumulators for each of three or more cylinder chambers in the hydrostatic bearing system including a bearing element which is urged toward the internal surface of the shell. A discrete pump can be provided for each and every cylinder chamber, and each such pump can (but need not always) supply liquid at a different pressure.

Due to the utilization of one or more reservoir systems, whose accumulator or accumulators are capable of yielding and expanding in response to expulsion of liquid from the cylinder chambers and in response to the need for admission of liquid into such chambers, the bearing element 8 can perform certain compensatory movements to account for the movements of the adjacent portion of the shell toward or away from the pistons 12 and 19 while the reservoir system or systems ensure that the pressure in the cylinder chambers remains at least substantially constant. In other words, the bearing element 8 can remain at an optimum distance from the adjacent portion of the internal surface 10 irrespective of whether the surface 10 moves toward or away from the carrier 6. As mentioned above, this invariably reduces the tendency of the shell 4 to perform vibratory movements, and this also reduces the extent of undesirable movements of the shell toward or away from the carrier 6 in the region of the hydrostatic bearing system 7. The operation of a pressure regulating system which is often employed in such types of rolls is not influenced by the provision of the elastically yieldable accumulator or accumulators of one or more reservoir systems because the pressure in the accumulator or accumulators invariably and automatically conforms to the pressure which is determined by the setting of the regulating valve 30 or regulating valves 130, 230. Thus, the accumulators need not even by adjusted when the attendant or an automatic control system selects a different setting of the valve 30 or valves 130, 230.

The insertion of the reservoir system or systems into the hydrostatic bearing system results in automatic elimination or pronounced reduction of instabilities, vibrations, impacts and/or other undesirable movements of the shell 4 which could lead to pressure peaks and adversely influence the functioning of the hydrostatic bearing system. The shell 4 runs smoothly and its external surface is less likely to be scored, scratched and/or otherwise affected in a manner as is the case when the shell is allowed or caused to perform excessive stray movements with reference to the carrier. The generation or development of pressure peaks is especially damaging to elastic seals, coatings or the like. The aforediscussed yieldability of the bearing element 8, and its ability to follow the outward movement of the adjacent portion of the shell, as a result of the utilization of one or more pressurized liquid reservoir systems further reduces the likelihood of damage to or premature destruction of elastic rolls due to development of thermally induced stresses which cause the diameters of such rolls to increase. Last but not least, the provision of one or more reservoir systems also reduces the intensity, magnitude and hence the damaging effect of vibrations, abrupt changes of pressure and impacts in the hydrostatic bearing system proper. For example, the stressing of the seals 12a and 19a is much less pronounced than in a roll wherein the hydrostatic bearing system is not combined with or does not embody one or more reservoir systems. This is due to the fact that the reservoir system or systems protect the piston seals from abruptly developing pressure peaks and hence from excessive wear. It has been found that the reservoir system or systems contribute to a much longer useful life of piston seals and/or analogous parts, namely, the useful life of such parts is a multiple of the useful life of corresponding parts in conventional rolls.

German Auslegeschrift No. 28 37 346 already discloses the utilization of a hydropneumatic accumulator in connection with hydrostatic bearings for rotary parts. The accumulator is connected with the inlet of a hydrostatic bearing block by a constant-flow valve which constitutes a flow restrictor and by a check valve which is closed during normal operation of the patented device. The sole purpose of the accumulator in such patented structure is to temporarily replace the pump or pumps when such pump or pumps are out of commission. The capacity of the accumulator is selected in such a way that it can supply the bearing with pressurized liquid only during that interval of time which is required by the braking system to bring the rotary body to a halt. In other words, the accumulator of the patented structure is operative only and alone when the regular source of pressurized fluid has failed and only for as long as is necessary to allow for stoppage of the rotary part without damaging the hydrostatic bearing. On the other hand, the accumulator or accumulators of the improved roll are operative while the source (28 or 130, 230) of pressurized liquid is in actual use to supply pressurized liquid to the respective chamber or chambers of the pressure generating means.

As mentioned above, the resistance which the parts serving to allow for communication between the accumulator or accumulators and the respective cylinder chamber or chambers offer to the flow of pressurized liquid should be low or very low, i.e., the pressurized liquid should be free to flow between the chambers 14, 21 and the accumulators 36, 37 or 136, 137, 236, 237 of the illustrated rolls practically without any obstruction. This enables the improved hydrostatic bearing system 7 to immediately respond to abnormal movements of the shell 4 relative to the bearing element 8. As also mentioned above, the resistance of the conduits and/or other parts which permit pressurized liquid to flow between the cylinder chamber or chambers and the accumulator or accumulators can be a minute fraction of the resistance which the conduits and/or similar parts offer to the undirectional flow of pressurized liquid from the source of sources to the cylinder chambers. This can be achieved by greatly reducing the length of conduit means (including the parts 34, 27, 16, 23, 15 and 22 of FIGS. 1 and 2) and/or the inner diameters of such conduit means. For example, the reservoir system or systems can be placed close or very close to the roll. Also, the conduit means connecting the accumulator or accumulators with the cylinder chamber or chambers need not contain any valves and/or other flow regulating devices which would offer additional resistance to the flow of liquid between the cylinder chamber or chambers and the associated accumulator or accumulators.

The provision of discrete regulating systems for the cylinder chambers which are connected with discrete sources of pressurized liquid is desirable and advantageous. This ensures that the hydraulic bearing system can compensate for transverse forces at least as satisfactorily as in the absence of reservoir systems. It is known that the provision of discrete sources of pressurized liquid for two or more cylinder chambers of the pressure generating means for a bearing element enables such pressure generating means to compensate for variations of transverse forces acting upon the shell. Reference may be had to the aforementioned U.S. Pat. No. 4,328,744. Transverse forces can develop as a result of frictional engagement between the shell and the running web.

The reservoir system or each of the reservoir systems can comprise a single accumulator. The utilization of batteries of two or more accumulators is often desirable and advantageous because this broadens the range of their effectiveness in compensating for and in counteracting undesirable stray movements of the shell with reference to the bearing element. Moreover, the provision of two or more accumulators which can confine supplies of liquid at different pressures is advisable and advantageous when the pressure of liquid which is supplied by the pump 28 or 128 is to be varied (at 30 or 130, 230) within a rather wide range.

Rolls which can be used in calenders or analogous machines and which can be modified to embody the present invention are disclosed in several United States Letters Patent, several pending United States patent applications as well as numerous foreign Letters Patent and pending applications granted to and owned by the assignee of the present application.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A pressure applying roll for use in calenders and the like, comprising a hollow rotary cylindrical shell having an internal surface; at least one bearing element provided in the interior of said shell and having an external surface provided with at least one recess and being adjacent to said internal surface; pressure generating means arranged to urge said bearing element toward said internal surface and having at least one chamber; flow restrictor means connecting said chamber with said recess; a source of pressurized liquid arranged to continuously supply liquid to said one chamber; an elastically yieldable pressurized liquid reservoir system communicating with said chamber, at least while such chamber is supplied with liquid by said source; first and second conduit means respectively connecting said one chamber with said source and with said reservoir system; and adjustable pressure regulating valve means in said first conduit means, the resistance of said first conduit means to the flow of liquid from said valve means to said one chamber being more pronounced than the resistance which is offered by said second conduit means to the flow of liquid between said reservoir system and said one chamber.

2. The roll of claim 1, wherein said pressure generating means comprises a plurality of chambers and said source includes means for supplying said chambers with pressurized liquid at different pressures.

3. The roll of claim 2, wherein said reservoir system comprises a plurality of accumulators each connected with a different one of said chambers.

4. The roll of claim 1, wherein said reservoir system comprises at least one accumulator.

5. The roll of claim 3, wherein at least one of said accumulators is a hydropneumatic accumulator.

6. The roll of claim 1, wherein said reservoir system comprises a hydropneumatic accumulator.

7. The roll of claim 1, wherein said reservoir system comprises a plurality of accumulators which are connected in parallel.

8. The roll of claim 1, wherein said reservoir system comprises a series of successive accumulators each arranged to store liquid at a different pressure.

9. The roll of claim 1, wherein said source includes a hydraulic pump.

10. The roll of claim 1, further comprising stationary carrier means for said bearing element and said pressure generating means.

11. The roll of claim 1, wherein said first conduit means includes a portion forming part of said second conduit means.

* * * * *

UNITED STATES PATENT AND TRADEMARK OFFICE
CERTIFICATE OF CORRECTION

PATENT NO. : 4,514,887
DATED : May 7, 1985
INVENTOR(S) : Richard RAUF et al.

It is certified that error appears in the above-identified patent and that said Letters Patent are hereby corrected as shown below:

```
Foremost page [54]  "CALENDARS" should read --CALENDERS--.
Column 1, line 1,   "CALENDARS" should read --CALENDERS--.
```

Signed and Sealed this

Twenty-second Day of October 1985

[SEAL]

Attest:

DONALD J. QUIGG

Attesting Officer

Commissioner of Patents and
Trademarks—Designate